(12) United States Patent
Blank et al.

(10) Patent No.: US 6,592,924 B2
(45) Date of Patent: Jul. 15, 2003

(54) GAME-TYPE FLAVORING AGENT

(75) Inventors: Imre Blank, Savigny (CH); Christoph Cerny, Winterthur (CH); Stephanie Devaud, Porsel (CH); Sven Heyland, Weiningen (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/877,907

(22) Filed: Jun. 8, 2001

(65) Prior Publication Data

US 2002/0028275 A1 Mar. 7, 2002

Related U.S. Application Data

(63) Continuation of application No. PCT/EP99/08910, filed on Dec. 1, 1999.

(30) Foreign Application Priority Data

Dec. 22, 1998 (EP) .............................. 98204369

(51) Int. Cl.$^7$ ................. A23L 1/22
(52) U.S. Cl. ............ 426/534; 426/2; 426/536; 426/538
(58) Field of Search ............ 426/534, 2, 533, 426/536, 538, 623, 635, 650

(56) References Cited

U.S. PATENT DOCUMENTS 3,922,367 A    11/1975    Gorbatov et al. ........... 426/536

FOREIGN PATENT DOCUMENTS

EP        0 110 362        4/1988

OTHER PUBLICATIONS

Fennema, O.R. ed., Food Chemistry, Third Edition, 1996, Marcel Dekker, Inc., New York, p. 752.*

N.G. Eider, "Analysis of Naphthenic Acid by Gas–Liquid Chromatography," Journal of Paint Technology, vol. 42, No. 548, pp. 504–509, 1970.

J.C. leffingwell et al., "Tobacco Flavoring for Smoking Products," R.J. Reynolds Tobacco Company, pp. 10–12, 1972.

B.L. Oser et al., "Recent Progress in the Consideration of Flavoring Ingredients Under the Food Additives Amendment, 11. GRAS Substances," Food Technology, pp. 60–70, Feb. 1978.

J.M. Bakke et al., "Volatile Compounds From the Red Deer (*Cervus Elaphus*). Secretion From the Tail Gland," Journal of Chemical Ecology, vol. 9, No. 4, pp. 513–520, 1983.

J.M. Bakke et al., "Volatile Compounds From the Red Deer (*Cervus Elaphus*). Substances Secreted Via the Urine," Comp. Biochem. Physiol., vol. 97A, No. 3, pp. 427–431, 1990.

J.K. Ha et al., "Volatile Alkylphenols and Thiophenol in Species–related Characterizing Flavors of Red Meats," Journal of Food Science, vol. 56, No. 5, pp. 1197–1202, 1991.

* cited by examiner

*Primary Examiner*—Leslie Wong
(74) *Attorney, Agent, or Firm*—Winston & Strawn

(57) ABSTRACT

A flavoring agent for enhancing or imparting game-type flavor in food products, including a combination of an alkylphenol and cyclohexanecarboxylic acid or an alkyl-substituted derivative thereof, and methods for preparing such of flavoring compositions and food products.

20 Claims, No Drawings

GAME-TYPE FLAVORING AGENT

CROSS-REFERENCE TO RELATED APPLICATION

This application is a continuation of the US national phase designation of PCT Application No. PCT/EP99/08910, filed Dec. 1, 1999, the disclosure of which is expressly incorporated by reference herein.

FIELD OF INVENTION

This invention relates to a flavoring agent intended for enhancing or imparting game-type flavor in food products.

BACKGROUND OF THE INVENTION

Meat-like flavorings and their method of preparation are well known. They can be produced, for example, by a thermal reaction between the free amino groups of amino acids and/or of peptides, and the carbonyl groups of reducing sugars. The combination of flavor molecules in the right proportions and the resulting mixtures represent another possibility to produce meat-like flavors. These preparations are also known as "compounded flavors." A combination of both approaches can also be applied to produce meat-like flavors.

Compounds responsible for meat flavor in food products and commonly used in compounded flavors are, for example, furfurylthiol, 2,5-dimethyl-4-hydroxy-3(2H)-furanone, methional, 2,3-diethyl-5-methylpyrazine, 2-methyl-3-furanthiol, furfural, 3-mercapto-2-butanone, maltol, sotolone, abhexone, butyric acid, diacetyl, 2,3-pentandione. Although game-type flavoring compounds have not yet been described, such compounds are desired to provide or enhance the flavor of foodstuffs with a game-type flavor.

SUMMARY OF THE INVENTION

This invention provides a flavoring agent for enhancing or imparting game-type flavor in food products, that includes a combination of an alkylphenol and cyclohexanecarboxylic acid or an alkyl-substituted derivative thereof.

Although cyclohexanecarboxylic acid is known as a flavor compound, it has not been described as being useful in meat-like or game-type flavors. Although alkylphenols are compounds widely found in nature, there previously was no evidence, however, that cyclohexanecarboxylic acid or alkylphenols, such as p-cresol, or an isomer thereof, are particularly useful to achieve game-type flavor notes. Nor are there any indications that the combination of both compounds might be useful to achieve this goal.

To obtain a specific desired game-type flavor in one embodiment, these two flavor compounds are preferably combined in a specific ratio (alkylphenol to cyclohexanecarboxylic acid) of 1:1 to 20:1 by weight. The flavoring agent may also contain a source of short chain alkyl acids that contribute to reinforce sweaty and animal-like notes to the overall flavor of the flavoring agent. The flavoring agent may also contain phenylacetic acid to further enhance the animal-like note. Thus, the flavoring agent is intended to give culinary products an authentic game-specific flavor note without using any meat extract, and may also be used to provide a game-specific flavor note in pet foods. Another aspect of the present invention is the use of this flavoring agent in flavor blends or in any process for the preparation of game-flavored products.

DETAILED DESCRIPTION OF THE INVENTION

As used herein, all percentages are given on the basis of weight, except where specifically stated otherwise. Also, the term "flavor" includes odor, aroma, or taste.

The flavoring agent includes a combination of an alkylphenol, or an isomer thereof, and cyclohexanecarboxylic acid or its alkyl-substituted derivatives, that may be mixed in a ratio of 1:1 to 20:1 by weight, and preferably in a ratio of about 6:1. The alkyl group of an alkyl-substituted derivative of cyclohexanecarboxylic acid can be, for example, methyl, ethyl, or propyl located in position 2-, 3-, or 4 of the cycle. The alkyl-substituted derivative can be a cis- or trans isomer or mixtures thereof. The alkylphenol may preferably be one of the three isomers: ortho, meta, or para of cresol, ethylphenol, or propylphenol.

In a preferred embodiment, the flavoring agent may also contain one or more of a source of short chain alkyl acids or a source of phenylacetic acid. Short chain alkyl acids are preferably those containing 4 to 6 carbons, such as butyric and isovaleric acid, that can be added in an amount of about 80% to 99.9%, and preferably 99.5%. Phenylacetic acid may be added in an amount of about 0.4% to 15%.

The flavoring agent can be prepared by mixing its constitutive compounds. The obtained mixture may be in a liquid or dried form. In a preferred embodiment, the liquid flavoring agent may contain p-cresol and cyclohexanecarboxylic acid in a ratio of 1:1 to 20:1. The ratio of the mixture p-cresol and cyclohexanecarboxylic acid to other acids is preferably 0.2:99.8 to 20:80. The dried flavoring agent can be prepared by mixing about 1% to 10% of the liquid flavoring agent with about 15% to 40% of maltodextrin and 1% to In a preferred embodiment, the flavoring agent may have an agouti-flavor note. Accordingly, the flavoring agent may have the following composition (Table 1).

TABLE 1

Composition of an agouti-type flavoring agent

| Compound | Composition (%) |
|---|---|
| Butyric acid | 45–75 |
| Isovaleric acid | 22–42 |
| Phenylacetic acid | 0–3 |
| p-Cresol/Cyclohexanecarboxylic acid | 0.1–10 |
| (ratio 1:1 to 20:1) | |
| Total | 100 |

Thus, the flavoring agent is intended to give an authentic game or meat-specific aroma note to culinary products, and may also be used to provide a game-specific aroma note in pet foods. The flavoring agent may be used directly in its liquid or dried form to enhance or impart game-type flavor in culinary products. The amount of the liquid form is preferably of about 0.05 to 5 g per kg of culinary product or pet food product, and depends on the requisite degree of aroma desired. The dried form of the flavoring agent can be used in an amount of 0.2 to 50 g per kg.

Another aspect of the present invention is the use of this agent in any process for the preparation of game-flavored food products. Accordingly, the flavoring agent may be used in a process where cystein and/or thiamine, a reducing sugar, and a plant protein hydrolysate can be used for the basic meat-flavor. The amount of added flavoring agent may be at least about 0.1%, and the concentration in the final culinary product or pet food product is preferably at least 1 mg/kg. After the thermal flavor reaction, which is preferably carried out in a stirred reactor with temperature control, the flavoring agent is added, either in its liquid or dried form, and the resulting mixture is homogenized and dried in a vacuum oven.

EXAMPLES

The following examples are given by way of illustration only and in no way should be construed as limiting the subject matter of the present application.

Example 1
Preparation of an Agouti-Type Flavoring Agent

A liquid agouti flavoring agent was prepared by mixing:

| | |
|---|---|
| 65% | butyric acid |
| 33% | isovaleric acid |
| 1.06% | phenylacetic acid |
| 0.84% | p-cresol |
| 0.1% | cyclohexanecarboxylic acid |

100 mg of the mixture was then diluted in 1 L of hot water to evaluate the flavor. The mixture had a very authentic smell and taste of agouti.

A dried form of the flavoring agent was obtained by mixing 2 g of the liquid flavoring agent, 32 g of maltodextrin, 6 g gum arabic and 60 g of water. The mixture was then spray-dried up to an amount of 2% humidity.

Example 2
Preparation of an Agouti Flavoring Composition

In order to prepare a flavoring composition, the following ingredients were mixed:

| | |
|---|---|
| Hydrolyzed plant protein | 45% |
| Water | 45% |
| IMP | 4% |
| Cystein HCl | 0.75% |
| Thiamin | 0.75% |
| Xylose | 1.5% |
| Beef fat | 2.75% |
| Onion extract | 0.25% |

The mixture was then submitted to a browning reaction in an autoclave at a temperature of about 105° C. for about 2 hours. 1% of the liquid agouti flavoring agent, as obtained in Example 1 was added. The obtained mixture was dried by means of a vacuum oven.

The resulting powder can be used directly in water to prepare a bouillon or to enhance agouti-flavor in culinary products.

Example 3
Agouti Flavored Bouillon 10 g of the flavoring composition obtained in example 2 was dissolved in 1 L of hot water. The solution had an authentic agouti flavor as perceived by smelling and tasting the sample.

Example 4
Bouillon With Agouti Flavor

A mixture of 370 g of maltodextrin, 190 g of salt, 100 g of yeast extract, 90 g of dextrose, 80 g of starch, 65 g beef fat, 40 g of sugar, 2 g citric acid and various condiments was prepared. 19 g of this mixture, 1 g of salt, and 1 g of the spray-dried agouti flavoring agent obtained as described in Example 1 were added to 1 L of hot water. The bouillon obtained had a specific agouti flavor as perceived by smelling and tasting the sample.

Example 5
Game-Flavored Pet Food Preparation

A mixture was prepared from 73% poultry carcass, pig lungs, and beef liver (ground), 16% wheat flour, 7% water, 2% dyes, 0.2% liquid agouti flavoring as prepared in Example 1, vitamins, and inorganic salts. This mixture was emulsified at 12° C. and extruded in the form of a pudding which was then cooked at a temperature of 90° C. The mixture was cooled to 30° C. and cut into chunks. 45% of these game flavored chunks were mixed with 55% of a sauce prepared from 98% water, 1% dye, and 1% guar gum. Tinplate cans were filled and sterilized at 125° C. for 40 min. This pet food had a pleasant game flavor as perceived by smelling the sample.

It is to be understood that the invention is not to be limited to the exact configuration as illustrated and described herein. Accordingly, all expedient modifications readily attainable by one of ordinary skill in the art from the disclosure set forth herein, or by routine experimentation therefrom, are deemed to be within the spirit and scope of the invention as defined by the appended claims. It is to be understood that the invention is not to be limited to the exact configuration as illustrated and described herein. Accordingly, all expedient modifications readily attainable by one of ordinary skill in the art from the disclosure set forth herein, or by routine experimentation therefrom, are deemed to be within the spirit and scope of the invention as defined by the appended claims.

What is claimed is:

1. A game-enhancing or imparting flavoring agent comprising a combination of (a) at least one alkylphenol or isomer thereof, and (b) at least one cyclohexanecarboxylic acid or alkyl-substituted derivative thereof, wherein the ratio of (a) to (b) is 1:1 to 20:1 by weight and wherein the combination enhances or imparts a game-type flavor to food products to which it is added.

2. The flavoring agent of claim 1, wherein the alkylphenol comprises one or more of a para, ortho, or meta isomer of cresol, ethylphenol, or propylphenol.

3. The flavoring agent of claim 1, further comprising a short chain alkyl acid.

4. The flavoring agent of claim 3, wherein the short chain alkyl acid comprises at least one of butyric or isovaleric acid.

5. The flavoring agent of claim 3, wherein the short chain alkyl acid is present in an amount of about 80% to 99.9%.

6. The flavoring agent of claim 1, further comprising phenylacetic acid.

7. The flavoring agent of claim 6, wherein the phenylacetic acid is present in an amount of about 0.4% to 15%.

8. The flavoring agent of claim 1, which comprises greater than 0.1% to 10% by weight of a combination of cyclohexanecarboxylic acid and p-cresol in order to obtain an agouti-flavor.

9. The flavoring agent of claim 8, further comprising 45% to 75% by weight butyric acid, 22% to 42% by weight isovaleric acid, and up to 3% by weight of phenylacetic acid.

10. The flavoring agent of claim 8, wherein the ratio of p-cresol and cyclohexanecarboxylic acid to other acids is 0.2:99.8 to 20:80.

11. A culinary product comprising at least 0.1% by weight of the flavoring agent of claim 1.

12. The culinary product of claim 11, which comprises 0.01% to 2% p-cresol and 0.0005% to 2% cyclohexanecarboxylic acid.

13. A culinary product comprising a dosage of at least 1 mg/kg of the flavoring agent of claim 1.

14. The flavoring agent of claim 1, comprising a dried mixture formed from 1 percent to 10 percent of the mixture of an alkylphenol, or an isomer thereof cyclohexanecarboxylic acid or an alkyl-substituted derivative thereof, from 15% to 40% maltodextrin, from 1% to 5% gum arabic, and from 50% to 80% water.

15. The flavoring agent of claim 14, the dried mixture has less than about 2% water content and the ratio of (a) to (b) is 6:1.

16. The flavoring agent of claim 1, which comprises 0.94% to 10% by weight of a combination of cyclohexanecarboxylic acid and p-cresol to obtain an agouti-flavor.

17. A pet food comprising at least 0.1% by weight of the flavoring agent of claim 1.

18. The pet food of claim 17, which comprises 0.01% to 2% p-cresol and 0.0005% to 2% cyclohexanecarboxylic acid.

19. A pet food comprising a dosage of at least 1 mg/kg of the flavoring agent of claim 1.

20. The flavoring agent of claim 1, wherein the ratio of (a) to (b) is greater than 1:1 to 20:1 by weight.

* * * * *

UNITED STATES PATENT AND TRADEMARK OFFICE
CERTIFICATE OF CORRECTION

PATENT NO. : 6,592,924 B2
DATED : July 15, 2003
INVENTOR(S) : Blank et al.

It is certified that error appears in the above-identified patent and that said Letters Patent is hereby corrected as shown below:

<u>Title page</u>,
Item [56], References Cited, OTHER PUBLICATIONS, change "J.C. leffingwell et al." to -- J.C. Leffingwell et al. --.

<u>Column 5</u>,
Line 7, after "claim 14", insert -- wherein --.

Signed and Sealed this

Ninth Day of September, 2003

JAMES E. ROGAN
*Director of the United States Patent and Trademark Office*